US008573718B2

(12) United States Patent
Griffiths et al.

(10) Patent No.: US 8,573,718 B2
(45) Date of Patent: Nov. 5, 2013

(54) MERCHANDISING UNIT WITH SWITCHABLE GLASS PANEL

(75) Inventors: Philip Griffiths, Bath (GB); Andras Tovisi, St. Legier (CH); Guido Ugo, Lausanne (CH)

(73) Assignee: Philip Morris USA Inc., Richmond, VA (US)

( * ) Notice: Subject to any disclaimer, the term of this patent is extended or adjusted under 35 U.S.C. 154(b) by 108 days.

(21) Appl. No.: 12/787,050

(22) Filed: May 25, 2010

(65) Prior Publication Data

US 2010/0294679 A1    Nov. 25, 2010

(30) Foreign Application Priority Data

May 25, 2009   (WO) ................ PCT/EP2009/003669

(51) Int. Cl.
*A47B 81/00*    (2006.01)
(52) U.S. Cl.
USPC .......................................... 312/290; 312/114
(58) Field of Classification Search
USPC ................ 312/290, 114–140; 206/242
See application file for complete search history.

(56) References Cited

U.S. PATENT DOCUMENTS

| D25,610 | S | * | 6/1896 | Arrell | D6/471 |
|---|---|---|---|---|---|
| 790,135 | A | * | 5/1905 | Jaeger | 312/138.1 |
| 1,307,261 | A | * | 6/1919 | Lee | 312/233 |
| 1,361,451 | A | * | 12/1920 | Flannery, Jr. | 312/117 |
| 2,014,516 | A | * | 9/1935 | Beddingfield | 312/118 |
| 2,727,327 | A | * | 12/1955 | Colby | 40/546 |
| 3,346,313 | A | * | 10/1967 | Fee | 312/234.1 |
| 4,141,610 | A | * | 2/1979 | Ando | 312/114 |
| 4,381,876 | A | * | 5/1983 | Fenwick | 312/114 |
| 4,449,761 | A | * | 5/1984 | Davis et al. | 312/116 |
| 5,348,383 | A | * | 9/1994 | Ritt | 312/138.1 |
| 5,380,080 | A | * | 1/1995 | Rubin et al. | 312/128 |
| 5,589,958 | A | * | 12/1996 | Lieb | 349/16 |
| 5,853,235 | A | * | 12/1998 | Barnes | 312/117 |
| 6,481,851 | B1 | * | 11/2002 | McNelley et al. | 353/28 |
| 6,897,936 | B1 | * | 5/2005 | Li et al. | 349/183 |

(Continued)

FOREIGN PATENT DOCUMENTS

| EP | 0303568 A1 | 2/1989 |
|---|---|---|
| GB | 2 232 520 | 12/1990 |
| WO | WO 2008/143781 | 11/2008 |

OTHER PUBLICATIONS

International Search Report and Written Opinion mailed Jan. 19, 2010 for International Application No. PCT/EB2009/003669.
International Preliminary Report on Patentability issued Nov. 29, 2011 for PCT/EP2009/003669.

*Primary Examiner* — Darnell Jayne
*Assistant Examiner* — Ryan A Doyle
(74) *Attorney, Agent, or Firm* — Buchanan Ingersoll & Rooney PC

(57) ABSTRACT

A merchandising unit for consumer goods includes at least one wall formed of one or more panels of electrically switchable glass which are switchable between a first state and a second state. The level of light transmission through the switchable glass is greater in the second state than in the first state. The merchandising unit includes a first compartment for housing the consumer goods. The first compartment includes the at least one wall formed from one or more electrically switchable glass panels, such that in the first state the consumer goods cannot be seen through the at least one wall and in the second state the consumer goods are visible through the at least one wall.

5 Claims, 2 Drawing Sheets

(56) References Cited

U.S. PATENT DOCUMENTS

| | | |
|---|---|---|
| 7,334,851 B2 * | 2/2008 | Rose et al. .................... 312/116 |
| 2005/0126858 A1 * | 6/2005 | Yingst et al. .................. 186/38 |
| 2006/0103275 A1 * | 5/2006 | Chang ........................... 312/290 |
| 2007/0097484 A1 | 5/2007 | Libretto et al. |
| 2007/0262683 A1 * | 11/2007 | Creed ........................... 312/290 |
| 2008/0079337 A1 * | 4/2008 | Vardaro et al. ............. 312/138.1 |

* cited by examiner

MERCHANDISING UNIT WITH SWITCHABLE GLASS PANEL

CROSS-REFERENCE TO RELATED APPLICATION

This application claims priority to International Patent Application No. PCT/EP2009/003669, filed May 25, 2009, the entire content of which is incorporated herein by this reference thereto.

BACKGROUND

A wide variety of different types of merchandising units are used to store, dispense, and display consumer goods at the point of sale. For example, in shops and kiosks, the majority of consumer goods are displayed on free standing or wall mounted shelving units and racks. However, it may be preferred to display and dispense certain items from units provided behind or underneath the counter, so that the items cannot be directly accessed or viewed by the consumer.

It would be desirable to provide a novel merchandising unit for consumer goods and in particular, for smoking articles, which provides increased flexibility in the storage and display of the consumer goods at the point of sale.

The present invention relates to a merchandising unit having at least one electrically switchable glass panel. The invention finds particular application as a merchandising unit for smoking articles.

SUMMARY

In a preferred embodiment, a merchandising unit for consumer goods includes at least one wall formed from one or more panels of electrically switchable glass. Preferably, the glass is switchable between a first state and a second state. Also preferably, the level of light transmission through the switchable glass is greater in the second state than in the first state.

In the preferred embodiment, the merchandising unit also includes a first compartment for housing the consumer goods. Preferably, the first compartment includes the at least one wall formed from one or more panels of electrically switchable glass. Also preferably, in the first state the consumer goods within the compartment cannot be seen through the one or more panels and in the second state the consumer goods are visible through the one or more panels. Preferably, the at least one wall includes a panel of graphics or text behind the switchable glass such that in the first state the graphics or text on the panel cannot be seen through the switchable glass and in the second state the graphics or text on the panel are visible through the switchable glass. Also preferably, in the first state the switchable glass is substantially opaque or translucent and in the second state the switchable glass is substantially transparent. Moreover, the glass is switchable from the first state to the second state upon the application of a voltage thereto. In the preferred embodiment, the at least one wall is formed of one or more panels of liquid crystal switchable glass.

Preferably, the merchandising unit can also include control means for operatively controlling the voltage applied to the switchable glass. In the preferred embodiment, the control means can include a switching means arranged such that upon actuation of the switching means during use, the switchable glass changes from the first state to the second state. Also in the preferred embodiment, the at least one wall is movable relative to the compartment in order to access the consumer goods therein and the movement of the at least one wall actuates the switching means. Preferably, the display unit includes one or more additional compartments for housing consumer goods, wherein at least one of the additional compartments is a moveable compartment and wherein, optionally, the movement of the moveable compartment actuates the switching means.

In the preferred embodiment, the merchandising unit contains packs of smoking articles.

BRIEF DESCRIPTION OF THE DRAWINGS

The merchandising unit will be further described, by way of example only, with reference to the accompanying drawings.

DETAILED DESCRIPTION

Figure 1:
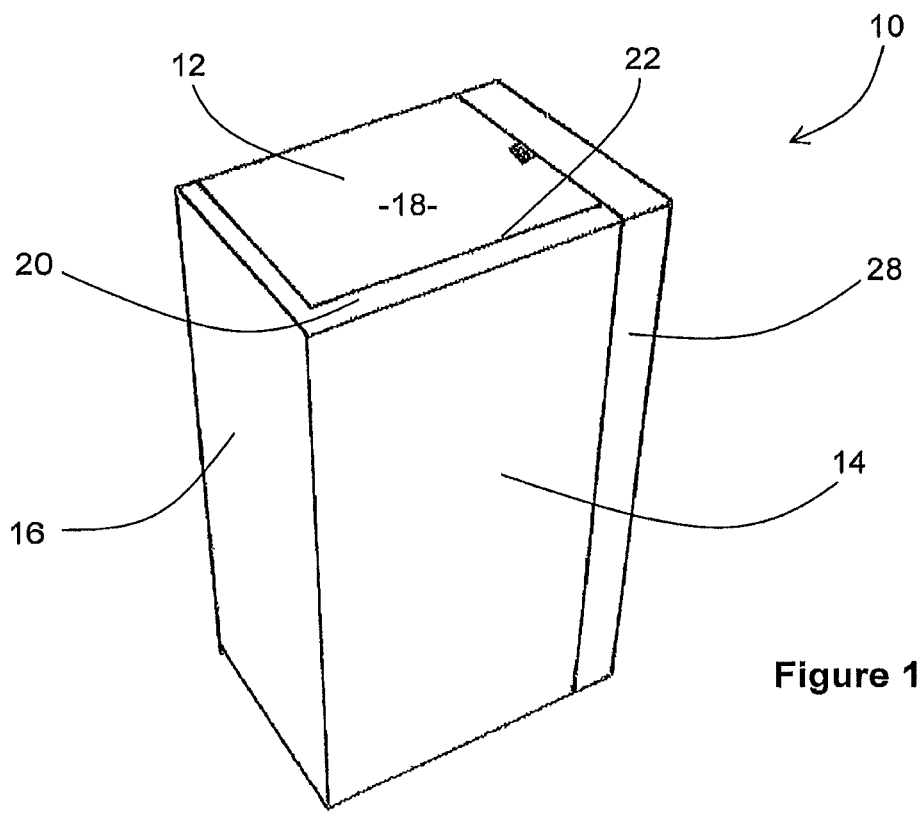
FIG. 1 shows a front view of a merchandising unit according to the invention with the electrically switchable glass in a first, translucent state.

In a preferred embodiment, a merchandising unit for consumer goods includes at least one wall formed from one or more panels of electrically switchable glass. Preferably, the glass is switchable between a first state and a second state. Also preferably, the level of light transmission through the switchable glass is greater in the second state than in the first state.

In the preferred embodiment, the merchandising unit offers greater flexibility in the display of consumer goods at the point of sale. In particular, the provision of an electrically switchable glass panel gives the retailer greater control over the visibility of the consumer goods within the unit. For example, the retailer is able to choose whether to display or hide the consumer goods, by choosing the state of the switchable glass.

Preferably, the electrically switchable glass in the one or more panels is switchable from the first state to the second state through the application of a voltage to the panel. Also preferably, the first state corresponds to the state of the switchable glass in the absence of any applied voltage.

The term "electrically switchable glass" is a well known term used to refer to glass which changes its light transmission properties when a voltage is applied to it. It is also commonly known as "smart glass" or "smart window". A number of different types of electrically switchable glass are available, including but not limited to, electrochromic glass, suspended particle device glass, and polymer dispersed liquid crystal glass. In the preferred embodiment, the one or more panels are formed of liquid crystal glass.

Electrochromic glass reversibly changes its color and opacity upon the application of a short burst of electricity. Typically, electrochromic glass changes between a transparent state and a colored, translucent state. Once the color change has occurred, no electricity is needed to maintain the color of the glass. In the preferred embodiment, the merchandising units may include one or more panels of electrochromic glass which in the first state are darkened and translucent and in the second state are transparent.

Suspended particle device (SPD) glass includes two layers of glass or plastic coated with a transparent conductive material and between which is provided a thin laminate of rod-like particles suspended in a fluid or suspension. In the absence of an applied voltage, the rod-like particles are randomly oriented and block the light so that the glass looks dark or opaque. When a voltage is applied, the suspended particles align themselves and allow light to flow or pass through the panel. Unlike with the electrochromic glass, a small current is required in order to retain the glass in its transparent state.

Polymer dispersed liquid crystal glass, referred to herein as "liquid crystal glass" is similar in construction and principle to the SPD glass described above. The liquid crystal film is formed by dissolving or dispersing liquid crystals in a liquid polymer and then curing and solidifying the polymer. As with the SPD glass, in the absence of an applied voltage, the liquid crystals are randomly oriented. This results in the light being scattered as it passes through the glass so that the glass takes on a translucent appearance. Upon application of a voltage, the liquid crystals align themselves and allow light to pass between them, through the panel. The degree of transparency of the glass can be controlled by controlling the applied voltage, since the higher the voltage, the greater the number of liquid crystals that become aligned and therefore the more light that is transmitted through the glass. Suitable liquid crystal glass panels are widely available, for example, from Smart Glass International.

Different types of switchable glass materials may be selected for use in the merchandising unit, depending on the degree of opacity, translucence or transparency that is desired in the first and second states and/or depending on the desired degree of control over the level of light transmission through the glass.

In the preferred embodiment, the at least one wall formed from the one or more switchable glass panels may be provided at any side of the merchandising unit. However, preferably, the switchable glass is provided such that the consumer goods are visible through the top or front of the merchandising unit when the glass is in its second state.

In the preferred embodiment, the merchandising unit includes a first compartment for housing the consumer goods, wherein at least one wall of the first compartment is formed from one or more panels of electrically switchable glass. In the first state, the consumer goods within the compartment cannot be seen through the at least one wall and in the second state the consumer goods are visible through the at least one wall. In the first state, the transmission of light through the glass is therefore preferably as low as possible. This is typically achieved by providing a switchable glass which is opaque or translucent in the absence of an applied voltage. On the other hand, in the second state, the transmission of light through the switchable glass is preferably as high as possible and the glass is preferably substantially transparent.

As used herein, the term "opaque" describes glass that absorbs light rather than transmitting it, so that the glass appears darkened. By "translucent" is meant that the glass transmits light but scatters the light to give a frosted or milky appearance, so that the glass cannot be seen through. By "transparent" is meant that substantially all light is transmitted through the glass.

Preferably, the first compartment of the merchandising unit is formed of a plurality of walls which include the one or more electrically switchable glass panels. Also preferably, the walls that are not formed from electrically switchable glass panels may be formed from any other suitable material. Preferably, the material for forming the other walls of the first compartment has a low level of light transmission, so that the consumer goods are not visible through those walls. This provides the possibility of keeping the consumer goods fully hidden or covered until the switchable glass is switched to its second state. Moreover, the size and shape of the first compartment may be adapted to suit the consumer goods to be housed therein.

In the preferred embodiment, the first compartment may be provided anywhere within the merchandising unit and may occupy all or just a part of the unit. However, preferably the first compartment is at the top of the merchandising unit to facilitate access to the consumer goods.

In the preferred embodiment, the merchandising unit may further include one or more additional compartments for housing consumer goods. For example, a merchandising unit may include a second compartment for housing a different type or brand of consumer goods than those in the first compartment. Optionally, the one or more additional compartments may include one or more walls formed of panels of electrically switchable glass. In the preferred embodiment, only the first compartment is formed of electrically switchable glass and the additional compartments are intended for storage of other consumer goods.

During use, the merchandising unit must be connected to a power supply which is capable of providing a sufficient voltage to switch the glass from the first state to the second state. The power supply does not form part of the merchandising unit. The power supply may be incorporated into the merchandising unit, for example, in the form of a battery or power pack, either of which may be rechargeable or replaceable. Alternatively, the merchandising unit may be adapted to connect it to the main electricity supply, for example, using a conventional plug.

Preferably, the merchandising unit further includes control means for operatively controlling the voltage applied to the switchable glass. With some types of electrically switchable glass, it is possible to continuously vary the level of light transmission through the glass between maximum and minimum values. This is accomplished by varying the voltage applied to the panel so as to allow for the light transmission properties of the switchable glass panel to be varied between the first state and the second state. Suitable control means for providing variable and continuous control of the voltage may be, for example, a slide or dial. However, preferably, the control means includes a switching unit which turns the voltage either on or off in order to switch the glass between the first and second states, respectively. The consumer goods within the compartment can therefore be displayed upon actuation of the switching unit.

Preferably, the at least one wall including the one or more switchable glass panels is moveable relative to the remainder of the merchandising unit. Preferably, movement of the at least one moveable wall opens the merchandising unit sufficiently that access can be gained to the consumer goods housed within it. The at least one wall may be slidably moveable relative to the remainder of the unit, for example, or may be pivotable about a hinge line extending along an edge of the panel.

Also preferably, the moveable wall is arranged such that when the merchandising unit is opened by moving the moveable wall, the consumer goods are visible to the consumer through the switchable glass. Access to the consumer goods by the consumer is therefore restricted, even in the second state. This may be achieved, for example, when the moveable wall is pivotable about a hinge line along the edge of the wall which is positioned closest to the consumer, so that the opening is at the opposite side of the merchandising unit to the consumer.

In the preferred embodiment, the merchandising unit includes switching means as described above and movement of the moveable wall actuates the switching means to transform the one or more switchable glass panels from their first state to their second state. This arrangement means that the consumer goods within the first compartment of the merchandising unit only become visible to the consumer through the switchable glass when the first compartment is opened to access the consumer goods by moving the at least one moveable wall. This allows the retailer to choose not to display the consumer goods until purchase.

Any additional compartments provided in the merchandising unit may also be accessed by means of a moveable wall or panel, as described above in relation to the first compartment. Alternatively, the additional compartments may themselves be moveable relative to the remainder of the merchandising unit. For example, the additional compartments may be in the form of one or more drawers which are slidably moveable into and out of the remainder of the merchandising unit.

Where the merchandising unit includes one or more additional, moveable compartments, the unit may be arranged such that the movement of the additional compartment actuates a switching means for switching the switchable glass panel between the first and second states. This may be instead of, or in addition to, the possibility of actuating the switching means upon movement of the at least one wall including the one or more switchable glass panels.

In the preferred embodiment, the first compartment may further include means for mounting the consumer goods to be housed therein. It may be desirable to incorporate such mounting means in order to facilitate the arrangement and dispensing of the consumer goods. For example, within the first compartment there may be provided one or more racks or stands for stacking the consumer goods. Alternatively, the consumer goods may be stacked within one or more cassettes, which optionally include spring loaded mechanisms to aid the dispensing of the consumer goods.

Preferably, the first compartment may further include a light for illuminating the consumer goods housed within the first compartment when the switchable glass is switched to the second state such that the consumer goods become visible.

Also preferably, the one or more switchable glass panels may include one or more areas in which graphics or text are provided on the inside surface such the graphics and text become visible only when the switchable glass is switched to its second state. Where the switchable glass is provided in one or more walls of the first compartment, the graphics and text may become visible. This advantageously gives the possibility of incorporating brand or product information underneath the switchable glass panel, the display of which can be controlled in the same way as the display of the consumer goods. This also provides the possibility of incorporating complementary brand or product information.

The size and shape of merchandising unit can be adapted to suit the consumer goods to be housed within the unit. In addition, the size and shape can vary to fit the space in which the merchandising unit is to be positioned. The outer surfaces of the merchandising unit, except for the switchable glass panels, may be provided with any desired surface finish. The outer surfaces may optionally display graphics or text, such as branding or product information relating to the consumer goods to be housed within the unit, or the retail outlet in which the unit is placed.

In the preferred embodiment, the merchandising unit finds particular application as a merchandising unit for the display and dispensing of packs of smoking articles. The merchandising unit may be adapted to house different numbers, sizes and shapes of packs of smoking articles and may be adapted to display the packs in a wide variety of ways.

Figure 2:
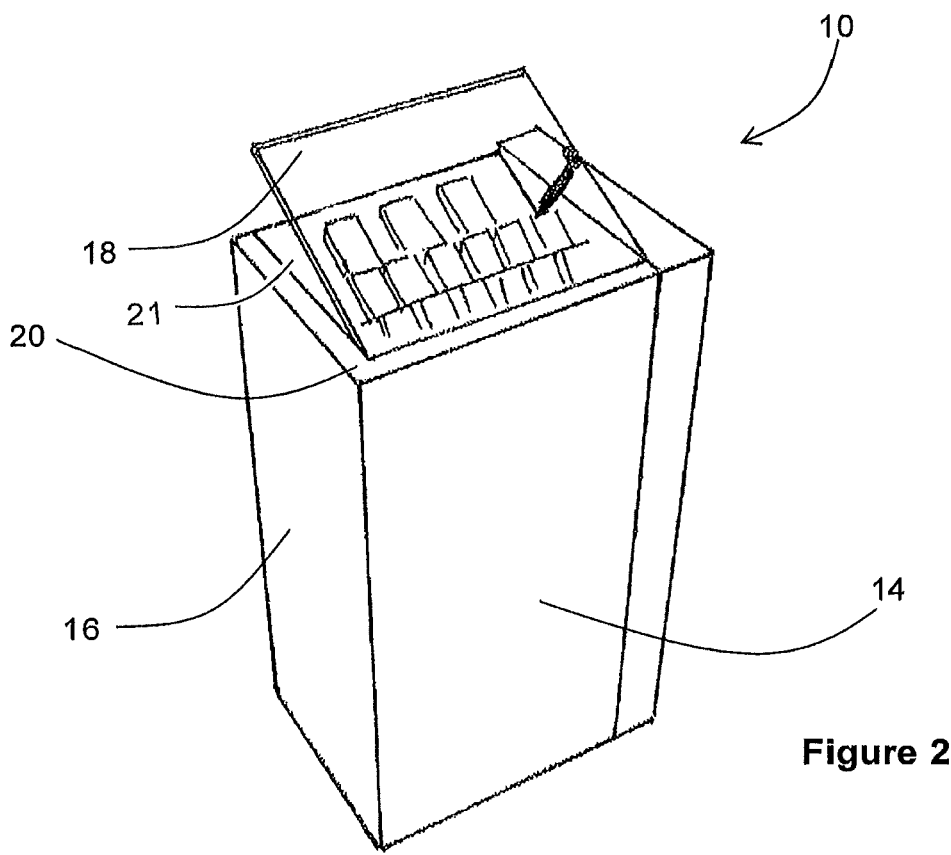
FIG. 2 shows a front view of the merchandising unit of FIG. 1 with the electrically switchable glass in a second, transparent state.

As shown in FIGS. 1 and 2, the merchandising unit 10 is substantially rectangular cuboidal in shape and includes a top wall 12, a front wall 14, a back wall, a left side wall 16, a right side wall and a bottom wall. Preferably, the merchandising unit 10 is of a sufficient height that the top wall 12 can form at least a part of a shop counter. As used herein, the terms "front", "back", "left" and "right" are from the point of view of a consumer standing in front of the counter.

In the preferred embodiment, a first compartment 21 is provided in the top third of the merchandising unit 10 and the upper wall of the first compartment is provided by the top wall 12. The first compartment 21 may house a plurality of packs of smoking articles, which are vertically stacked in two rows of spring loaded cassettes. The upper packs within the cassettes are arranged with their front faces displayed.

Preferably, the top wall 12 includes a panel of electrically switchable liquid crystal glass 18, mounted within a narrow mount 20 which extends along the left and front edges of the top wall. In the absence of an applied voltage, the liquid crystal glass is translucent or opaque, so that it is not possible to see through the top wall 12 into the first compartment 21 in which the packs of smoking articles are housed. The mount 20 of the top wall 12 and the remaining walls of the merchandising unit 10 are opaque such that it is not possible to see through them into the inside of the merchandising unit 10.

Also preferably, the top wall 12 is connected to the front wall 14 along a hinge 22 extending across the top, front edge of the merchandising unit 10. The top wall 12 is therefore moveable between a closed position, as shown in FIG. 1, and an open position, as shown in FIG. 2, in which the top wall opens to an angle of approximately 45 degrees relative to its closed position. In the preferred embodiment, the top wall 12 must be opened in order for the retailer to access the packs of smoking articles housed within the first compartment 21. Preferably, the position of the hinge 22 is such that only the person behind the counter and not the consumer in front of the counter can gain access to the first compartment 21.

During use, the merchandising unit 10 is connected to the main electricity supply (not shown) by means of a standard electrical plug, such that a voltage may be applied to the liquid crystal glass panel. Preferably, a switch (not shown) is arranged such that upon opening of the top wall 12, the switch is actuated and voltage is applied to the liquid crystal glass. Moreover, the applied voltage causes the glass 18 to switch from a translucent state into a transparent state. As a result, upon opening the top wall 12 the packs of smoking articles within the first compartment 21 become visible to the consumer at the front of the counter.

Figure 3:
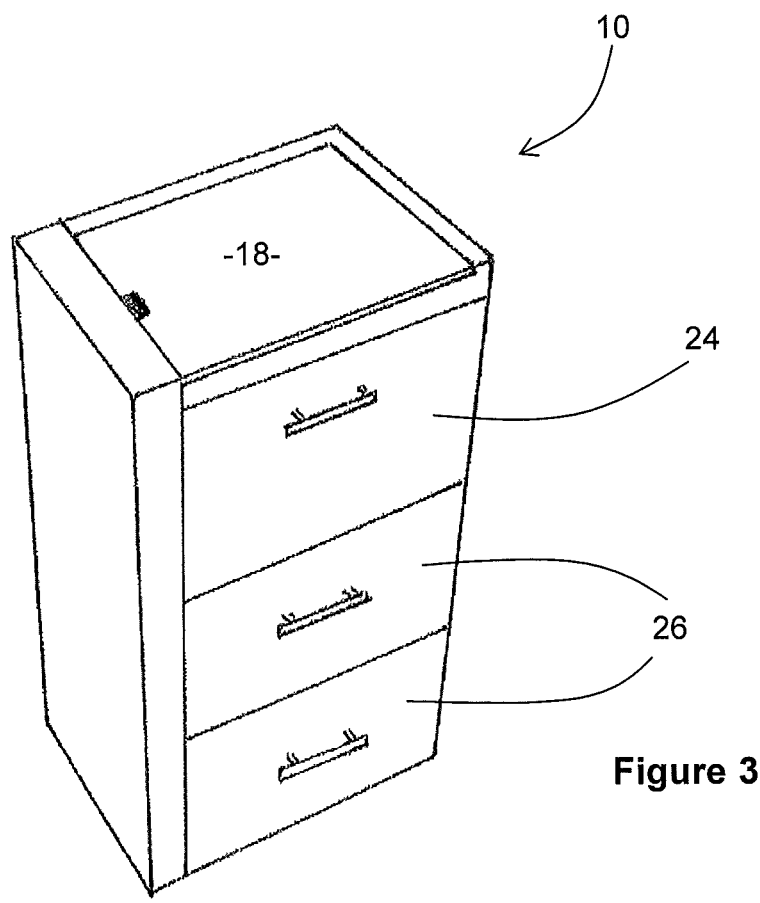
FIG. 3 shows a back view of the merchandising unit of FIGS. 1 and 2.

In the preferred embodiment, as shown in FIG. 3, the first compartment is provided in a top drawer 24, which is slidable out of the unit 10 in a backwards direction, away from the front wall 14 of the unit and the consumer. This top drawer 24 may be opened in order to restock the compartment, but will typically not be opened when the packs of smoking articles are dispensed, since this will be done through the upper side of the merchandising unit 10.

Preferably, the merchandising unit 10 further includes two additional drawers 26 beneath the top drawer 24, which may be used to store other packs of smoking articles. It is not possible to display the packs of smoking articles within these two drawers 26 and they are therefore for the purposes of storage only. Each drawer 26 is independently slidable in the same direction as the top drawer 24.

Preferably, a switch (not shown) is associated with each drawer 26 such that the opening of either drawer actuates the switch and turns on the voltage to the liquid crystal glass panel 18. In this way, the packs in the first compartment 21 may be displayed to the consumer by opening one of the drawers 26 rather than the top wall 12 (shown in FIG. 1).

In the preferred embodiment, a separate, rectangular panel 28 is provided on one side of the merchandising unit. This panel includes an electrical light inside it so that the panel may be lit up during use. The visible walls of the panel 28 (at the front and top of the unit 10) may be provided with branding or product information (not shown). This information will be highlighted when the panel is illuminated.

In this specification the word "substantially" is sometimes used with respect to terms. When used with geometric terms, the word "substantially" is intended to encompass not only features which meet the strict definitions but also features which fairly approximate the strict definitions.

While the foregoing describes in detail a preferred a merchandising unit with switchable glass panel with reference to a specific embodiment thereof, it will be apparent to one skilled in the art that various changes and modifications may be made to the merchandising unit, which do not materially depart from the spirit and scope of the foregoing description. Accordingly, all such changes, modifications, and equivalents that fall within the spirit and scope of the appended claims are intended to be encompassed thereby.

We claim:

1. A merchandising unit for consumer goods comprising
 a front wall, a back wall, a left side wall, a right side wall, a bottom wall and a top wall, at least the top wall being formed from one or more panels of electrically switchable glass and the top wall being hingedly connected to the front wall by a hinge extending across the top, front edge of the merchandising unit, the glass being switchable between a first state and a second state;
 a first compartment operable to house consumer goods, the first compartment including the top wall formed from the one or more panels of electrically switchable glass;
 at least one additional moveable compartment operable to house consumer goods and openable from the rear wall; and
 a switching unit connected to the switchable glass for operatively controlling voltage applied to the switchable glass, the switching unit being actuated by movement of the at least one additional moveable compartment to an open position and by pivoting of the top wall of the first compartment about the hinge to an open position,
 wherein the level of light transmission through the switchable glass is greater in the second state than in the first state, the glass being in the first state when the top wall is in a closed position and the at least one additional compartment is in a closed position such that consumer goods in the unit are not visible through the glass and the glass being in the second state when the top wall is pivoted about the hinge or the at least one additional compartment is open such that the consumer goods are visible through the glass,
 wherein the merchandising unit contains packs of smoking articles, and
 wherein the first compartment includes one or more racks operable to hold the consumer goods.

2. The merchandising unit of claim 1, wherein in the first state the switchable glass is substantially opaque or translucent and wherein in the second state the switchable glass is substantially transparent.

3. The merchandising unit of claim 1, wherein the glass is switchable from the first state to the second state upon the application of a voltage thereto.

4. The merchandising unit of claim 1, wherein the top wall is formed of one or more panels of liquid crystal switchable glass.

5. The merchandising unit of claim 1, wherein the first compartment includes a light operable to illuminate the consumer goods housed therein.

* * * * *